(12) United States Patent
Russell

(10) Patent No.: US 6,348,674 B1
(45) Date of Patent: Feb. 19, 2002

(54) METHOD AND APPARATUS FOR PRETENSIONING REMOTELY INSTALLED CLAMPS AND FLANGES

(76) Inventor: Larry R. Russell, 3607 Gramercy, Houston, TX (US) 77025-1320

( * ) Notice: Subject to any disclaimer, the term of this patent is extended or adjusted under 35 U.S.C. 154(b) by 0 days.

(21) Appl. No.: 09/648,652

(22) Filed: Aug. 25, 2000

(51) Int. Cl.⁷ .............................. F16B 4/00; H05B 3/00
(52) U.S. Cl. ...................... 219/243; 219/201; 403/30
(58) Field of Search ................................. 219/243, 200, 219/201, 521; 411/395, DIG. 2, 916; 403/28–30, 373–374.4

(56) References Cited

U.S. PATENT DOCUMENTS

| | | | | |
|---|---|---|---|---|
| 1,682,338 A | * | 8/1928 | Hodgkinson | 219/200 |
| 2,176,601 A | * | 10/1939 | Bates | 219/50 |
| 2,359,046 A | * | 9/1944 | Miller | 411/DIG. 2 |
| 2,888,292 A | * | 5/1959 | Schoessow | 403/28 |
| 2,910,933 A | * | 11/1959 | Danly | 100/214 |
| 4,010,669 A | * | 3/1977 | Kloren | 411/544 |
| 4,450,616 A | | 5/1984 | Morita | |
| 4,991,563 A | * | 2/1991 | Ashley | 411/916 |
| 5,196,673 A | * | 3/1993 | Tanis | 219/200 |
| 5,437,489 A | * | 8/1995 | Sanders et al. | 294/88 |
| 5,690,456 A | * | 11/1997 | Wedellsborg | 411/383 |
| 5,772,378 A | | 6/1998 | Keto-Tokoi | |
| 6,105,471 A | * | 8/2000 | Takayuki et al. | 81/57.38 |

FOREIGN PATENT DOCUMENTS

| | | | | |
|---|---|---|---|---|
| DE | 2345610 | * | 4/1975 | |
| FR | 2205083 | * | 6/1974 | |
| FR | 2236286 | * | 1/1975 | 403/28 |
| JP | 51-117263 | * | 10/1976 | |
| JP | 54-121305 | * | 9/1979 | |
| JP | 2-102908 | * | 4/1990 | |
| JP | 3-48007 | * | 3/1991 | 403/28 |
| JP | 10-103325 | * | 4/1998 | |
| JP | 11-198056 | * | 7/1999 | |

\* cited by examiner

*Primary Examiner*—John A. Jeffery
(74) *Attorney, Agent, or Firm*—Elizabeth R. Hall

(57) ABSTRACT

A method and apparatus for securing prestressed or pressure-containing connections, such as in a pipe clamp, in remote or hazardous locations. A connection, having bolts that are heated and pretensioned, can easily be uniformly tightened with a robotic device.

34 Claims, 4 Drawing Sheets

METHOD AND APPARATUS FOR PRETENSIONING REMOTELY INSTALLED CLAMPS AND FLANGES

BRIEF DESCRIPTION OF THE INVENTION

The present invention relates in general to a method and apparatus for securing pressure-containing equipment, such as a pipe clamp, in remote or hazardous locations. More particularly, the invention relates to a method and apparatus for pretensioning bolts using a robotic device or mechanical manipulator.

BACKGROUND OF THE INVENTION

A very common problem in the assembly of pressure-containing equipment is the proper tightening of groups or sets of bolts used to clamp sealing surfaces together. It is important to get uniform tensioning of the bolting in order to ensure pressure containment and avoidance of bolt overstress or pressure vessel distortion. This same problem occurs in some types of structural connections, such as securing mated flanges.

The most commonly used approach in manual or machine tightening of sets of bolts is the sequential tightening of the bolts with multiple cycles of incremental load application to each of the bolts by means of a torque wrench. A typical procedure of this type would be the tightening of the head bolts on an engine. Such an approach is noted for being fairly sensitive to frictional variations and is therefore prone to inaccuracies.

Pipe clamps used for repairing a localized leak in a pipeline consist essentially of a resilient gasket that is placed over the leak and held with sufficient force to effect a seal. Sealing pressure-containing equipment typically involves releasing the pressure, placing the seal in the proper location, applying pressure to the seal, and reintroducing the pressure into the pipeline or pressure-containing equipment. The clamp or other device that applies loading to the seal is pretensioned, or pretightened to apply the appropriate amount of pressure, before the pressure is reintroduced into the pressure-containing equipment.

Pipe clamps are commonly used in land-based and underwater applications which cannot be directly serviced by personnel, such service being performed by robots or by personnel working from some distance utilizing submersible craft with remote manipulators. One limitation of robots and remote manipulators is that they cannot reliably or efficiently perform fine mechanical maneuvers such as threading together a nut and a bolt. Furthermore, in remote applications it becomes difficult to provide uniform tightening of sets of bolts, where each bolt must be tightened securely with a uniform application of force to the nuts.

It has been common practice, in general construction work that uses conventional helically threaded bolts for fixedly securing mating flanges, to thermally stretch or elongate hollow bolts prior to tightening the nut with a torque wrench or other rotational means. By thermally elongating a bolt, one can uniformly tighten a bolt with minimal effort and the bolt will be appropriately pretensioned when it cools. By applying thermal stretching procedures to bolts, one can predetermine tension preload while minimizing the rotational torque required to achieve the desired tension on the bolt. Likewise, in releasing such bolts, the use of thermal elongation is also used to enable the associated nut to be loosened with less force.

The heating of bolts having an axial bore with an internal heating means such as an electrical heating element has been described, as for example in U.S. Pat. No. 4,991,563. While the use of electric heating devices permit a very reliable means of obtaining a uniform manual pretensioning of bolts, use of such heating devices to ensure the proper bolt tightening of pressure containing equipment in remote applications has not been described. In addition, no methods or apparatus has been described that would allow the simultaneous heating of a group of bolts to ensure the uniform heating of a series of bolts to allow uniform pretensioning of the bolts.

In fact, the use of such heating devices with conventional tightening procedures is neither simple nor practical in remote applications. Tightening bolts in such remote applications is difficult because of a lack of visibility of the bolts, equipment access to the bolts or nuts and equipment operational limitations such as proper alignment. U.S. Pat. No. 5,437,489 describes a method of using a hydraulically-thrusted wedge system to pretension bolts at a remotely installed pipe clamp using a wedge system. However, the means illustrated in that patent requires a very large thrust on each wedge in order to achieve a sufficient tightening of the bolting of the clamp. The large magnitude of the tightening thrust is due to the high friction inherent in the use of wedges for imposing high axial stresses. The thrust is provided by a hydraulic cylinder, but controllability of pretension is limited by the unknown frictional resistance to the pretensioning of the bolting and the size and cost of the necessary actuating cylinder and its supporting structure.

Thus, a need exists for a method and apparatus for remotely pretensioning a bolted connection which is easily operated by routine construction equipment, particularly a method and apparatus for uniformly pretensioning a series or group of bolts.

A further need exists for a method and means to simply reverse the remotely performed pretensioning of a bolted connection with minimal force.

SUMMARY OF THE INVENTION

The invention contemplates a simple, inexpensive device for solving the problems and disadvantages of the prior approaches discussed above. The present invention provides a rapid, reliable and accurate tightening of bolting in remote locations.

One aspect of the present invention is an apparatus for prestressing structural joint connections comprising: (i) two clampable elements with comating first surfaces; (ii) first and second wedging elements having comating ramps, the second wedging element positioned between the first wedging element and one of the clampable elements; (iii) one or more connecting elements traversing the two clampable elements and the first and second wedging elements such that a first end of each connecting element engages the outside surface of one of the clampable elements and the second end of the connecting element engages the outside surface of the first wedging element; and (iv) heating means for heating the connecting elements. Thus, when the ramped face of the first wedging element is moved it changes the tension on the connecting elements thereby changing the pressure between the comating surfaces of the clampable elements. The movement of the ramped face of the first wedging element is particularly effective when the heating means have been activated to heat the connecting means thereby thermally expanding the lengths of the connecting means and decreasing the force necessary to move the first wedging element.

In accordance with another aspect of the invention an apparatus is described for uniformly thermally expanding a set of bolts comprising: (i) a set of bolts, each bolt having an internal bore; (ii) a plurality of electrical heating elements, wherein one heating element is placed within the internal bore of each bolt; (iii) a power source; and (iv) a series of electrical connectors, each connector connected to the power source, to one of the heating elements within one bolt and to a switch where the switch responds to the temperature of the one bolt as determined by a temperature sensor in communication with the bolt and the switch.

In accordance with yet another aspect of the invention, the bolt shafts are preheated to a predetermined temperature above ambient, pretensioned at a first, lower level, at the increased temperature using a wedge system, and allowed to cool to ambient temperature., whereby the bolt shafts are pretensioned to a second, higher level.

In accordance with still yet another embodiment of the present invention, the prestressing of structural joint connections is accomplished by: (i) encompassing a structural joint connection with an apparatus for prestressing structural joint connections, the apparatus comprising first and second clampable elements, said clamping elements having comating first surfaces and obverse second surfaces; a first wedging element having a first face and a second obverse face, said first face having at least one ramp; a second wedging element having a ramped surface, wherein each ramp of the ramped surface comates with one ramp of the first wedging element, wherein said second wedging element is positioned between the second obverse surface of the first clamping element and the ramped first face of the first wedging element; one or more connecting elements traversing the two clampable elements, the first wedging element and the second wedging element, each connecting element having a first end engaging the second surface of the second clampable element and a second end engaging the obverse face of the first wedging element; and heating means for heating the connecting elements, wherein one heating means selectively transfers heat to each connecting element; (ii) thermally expanding the connecting elements to obtain increased lengths of said connecting elements relative to the unheated lengths of the connecting elements thereby reducing the tension on the connecting elements; (c) activating a double-acting hydraulic means connected to the first wedging element; (d) moving the first ramped surface of the first wedging element to produce an initial wedging of the comating ramped faces of the first wedging element and the second wedging element to achieve an increased level of tension on the connecting elements; and (e) cooling the connecting elements to decrease the length of the connecting elements to further increase the tension on the connecting elements thereby increasing the compression on the comating first surfaces of the two clampable elements.

The foregoing has outlined rather broadly several aspects of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed might be readily utilized as a basis for modifying or redesigning the structures for carrying out the same purposes as the invention. It should be realized by those skilled in the art that such equivalent constructions do not depart from the spirit and scope of the invention as set forth in the appended claims.

BRIEF DESCRIPTION OF THE DRAWINGS

The novel features which are believed to be characteristic of the invention, both as to its organization and methods of operation, together with the objects and advantages thereof, will be better understood from the following description taken in conjunction with the accompanying drawings, wherein.

DETAILED DESCRIPTION OF THE INVENTION

The present invention provides a rapid, reliable and accurate tightening of bolts in remote or hazardous locations. The bolt shafts are preheated to a predetermined temperature above ambient, pretensioned at the increased temperature, and allowed to cool to ambient temperature. The invention is particularly applicable to use in remote applications, such as subsea, high temperature and radiation generating environments.

Figure 1:
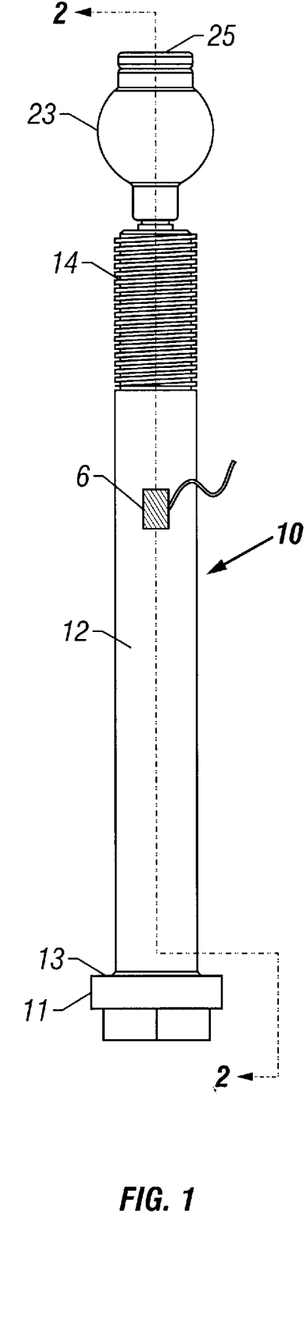
FIG. 1 shows a side view of one embodiment of a bolt with an electric heating element mounted therein.
Figure 2:
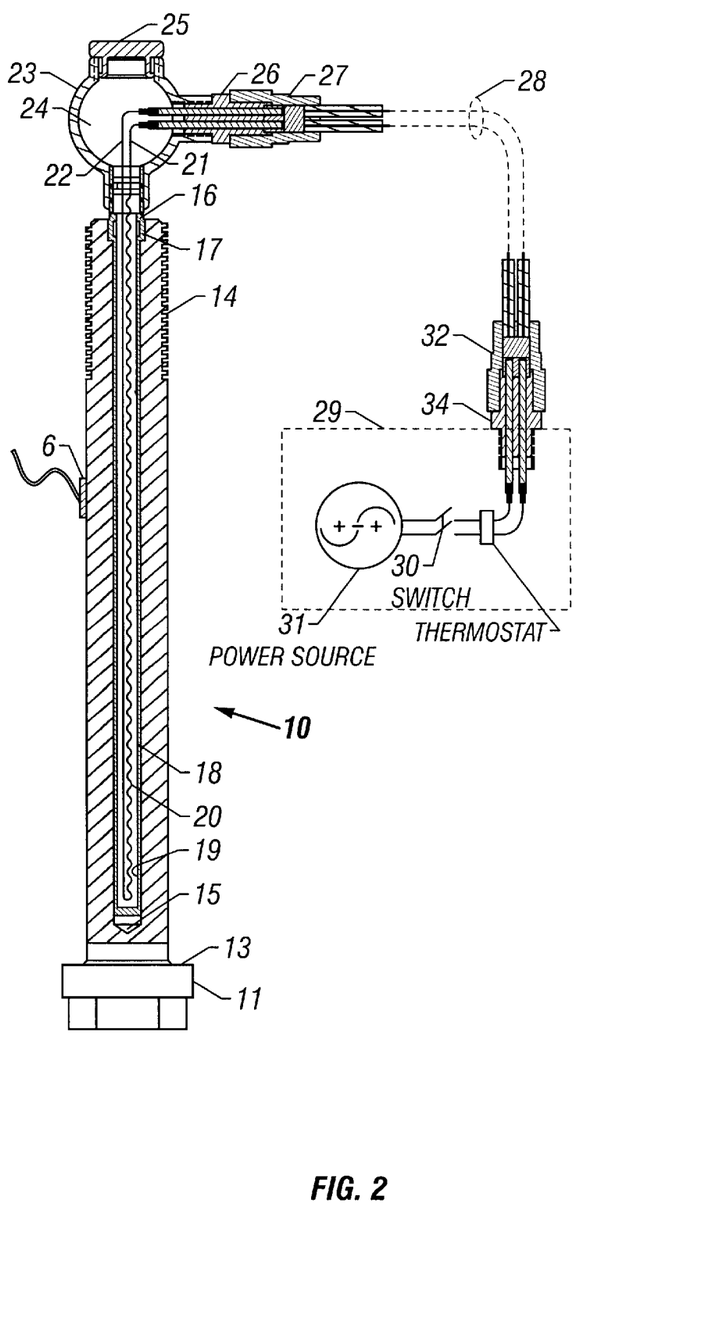
FIG. 2 shows a partial cross-section of the bolt illustrated in FIG. 1 as well as a schematic of the electrical components controlling the application of power to the heating elements.

Referring now to the drawings, and initially to FIGS. 1 and 2, it is pointed out that like reference characters designate like or similar parts throughout the drawings. The Figures, or drawings, are not intended to be to scale. For example, purely for the sake of greater clarity in the drawings, wall thickness and spacing are not dimensioned as they actually exist in the assembled embodiment.

In FIGS. 1 and 2, a bolt 10 is provided with a head 11 with a larger diameter than the shank 12 of the bolt and a bearing surface 13 on the inboard side of the head 11. Bearing surface 13 typically is planar and transverse to the axis of shank 12, but head 11 may also be conical or stepped or threaded. Helical threads 14 of a conventional pattern, for engaging a tightening element such as a nut or nut plate, are on the opposite end of bolt 10 from the head 11.

The bolt 10 in FIGS. 1 and 2 is bored from the threaded end, opposite head 11, in order to provide an elongate interior cylindrical recess 15 extending only partially through but substantially the entire length of the bolt 10. Recess 15 may extend the entire length of bolt 10, but the distal end of the recess would generally be plugged in such a case. Recess 15 is used to introduce a heating means into the bolt. The heating means may represent hot air, hot liquid, or an insertable resistance heater device. Suitable tubular resistance heater devices that are insertable in an axial hole in a bolt, are commercially available from various manufacturers, such the Gaumer Company, Inc., Houston, Tex.

Figure 3:
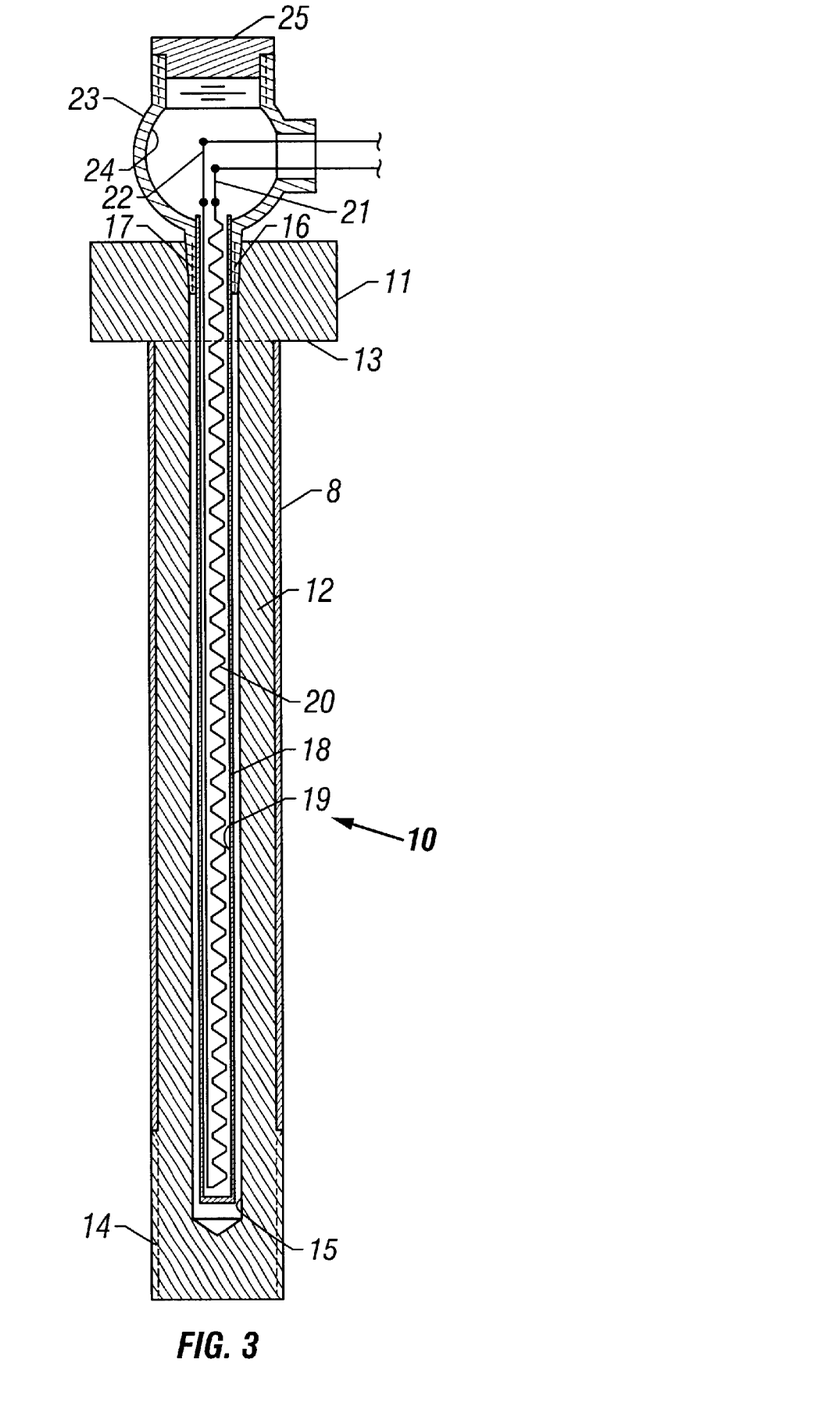
FIG. 3 illustrates a partial cross-section of a second embodiment of a bolt with an electric heating device mounted therein.

Alternatively, bolt 10 may be bored from the head end, opposite the threaded end, as illustrated in FIG. 3. FIG. 3 shows how the external surface of shank 12, except for the surface area covered by helical threads 14, may have an optional covering 8 of insulative material to minimize thermal losses and attendant heating needs in an aqueous or other high heat loss environment.

In a preferred embodiment, the open end of recess 15 is provided with threads 16 in order to engage the comating threads 17 of a tubular heating element assembly 18. Generally, threads 16 and 17 will be a sealing type of thread, such as a tapered pipe thread. Heating element assembly 18 closely fits recess 15 in order to permit transfer of heat from it to the body of bolt 10. In some cases heat transfer compounds may be introduced into recess 15 in order to improve heat transfer from heating element assembly 18 to the body of the bolt 10. Within the tubular housing 19 of heating element assembly 18 is an electric resistance heating element 20.

The resistive heating element 20 is heated by connection to a power source 31 through conductive wires 21 and 22. One end of each conductive wire 21 and 22 is attached to opposite ends of the heating element 20 and the other end of each conductive wire 21 and 22 is attached to the power source 31, one conductive wire to each output terminals of the power source 31. Power source 31 may be any suitable source of electrical energy such as one or more batteries, or an AC power source.

Connective wires 21 and 22 are housed within connector housing 23. Connector housing 23 has a hollow cavity 24 inside with a removable sealing access cover 25 penetrating its wall in order to provide access to and around connective wires 21 and 22. Typically, the cavity 24 of connector housing 23 is filled with a nonconducting potting compound.

The removable sealing access cover 25 permits access to connecting wires 21 and 22 so that they are easily connected to a multiconductor power cable connector 26. A preferred embodiment of the invention uses a male underwater pluggable connector for connector 26. The male pluggable connector 26 is engaged by a female underwater pluggable connector 27 at one end of a multiconductor electric cable 28. A similar pair of male-female pluggable connectors 32 and 34 are located at the other end of electric cable 28.

The male connector 34 is mounted in the wall of a sealed, pressure-resistant, explosion-proof watertight box 29 and is attached both to a selectably operable switch 30 and electric power source 31. Electric power from source 31 is selectably connected at switch 30 to power cable 28 in order to apply heat to bolt 10 when desired.

If desired, the amount of heat generated by the resistive heating element 20 can be controlled using a temperature sensing device 6 such as a thermostat, thermocouple or thermistor. In addition, the heating of the resistive heating element can be controlled by a control means. The control means may be a current regulator, a timer, a switch, or other control mechanism that can be used to interrupt or stop the flow of electricity to the heating element and may be operated by a manual or automatic mechanism. A preferred embodiment is the switch 30 that is in communication with the temperature sensing device 6 to independently regulate the heating of the bolts 10. Thus, a set of bolts can be uniformly heated and expanded.

Bolt 10 can be used in the assembly or maintenance of equipment underwater, in space, at nuclear plants and at other remote or hazardous locations. Bolt 10 can be used to secure the fastening of any two surfaces together, as for example mating flanges or the two sides of a pipe clamp. Bolt 10 can be installed and pretensioned using routine construction equipment or a robotic device. Heating element 20 can be used to uniformly elongate bolt 10 to a predetermined degree. In addition, heating element 20 and bolt 10 are designed to allow the powering up of the heating element 20 with a power source provided on a robotic device or external manipulators.

A plurality of bolts 10 can also be used together as, for example, to assemble a pipe clamp such as the one illustrated and described in U.S. Pat. No. 5,437,489, which is incorporated herein by reference. The number of bolts 10 used is generally determined by the configuration of the clamp and the amount of internal pressure to be sealed.

The bolts are typically pretightened onto the wedges at room temperature in the shop using constant torque for each. They are then applied to the site to be secured, heated and field tightened as described in more detail below. The ability to heat and elongate each bolt 10 within the series of bolts at the same time and in a uniform manner substantially improves the ability to uniformly tighten a series or set of bolts 10. Each of the plurality of bolts 10 can be powered at the same time by connecting the series of bolts 10 through a series of interconnected electrical connectors 27 when they have similar size and insulation conditions. If this should not be the case, then the bolt temperatures can be individually sensed and heating individually discontinued upon attainment of the desired temperature.

Once a series of bolts 10 have been heated and elongated to a predetermined degree, each bolt 10 of the series of bolts 10 can be tightened. A preferred embodiment utilizes a wedge system such as described below and illustrated in FIG. 3 to tighten the bolts in a uniform manner.

Figure 4:
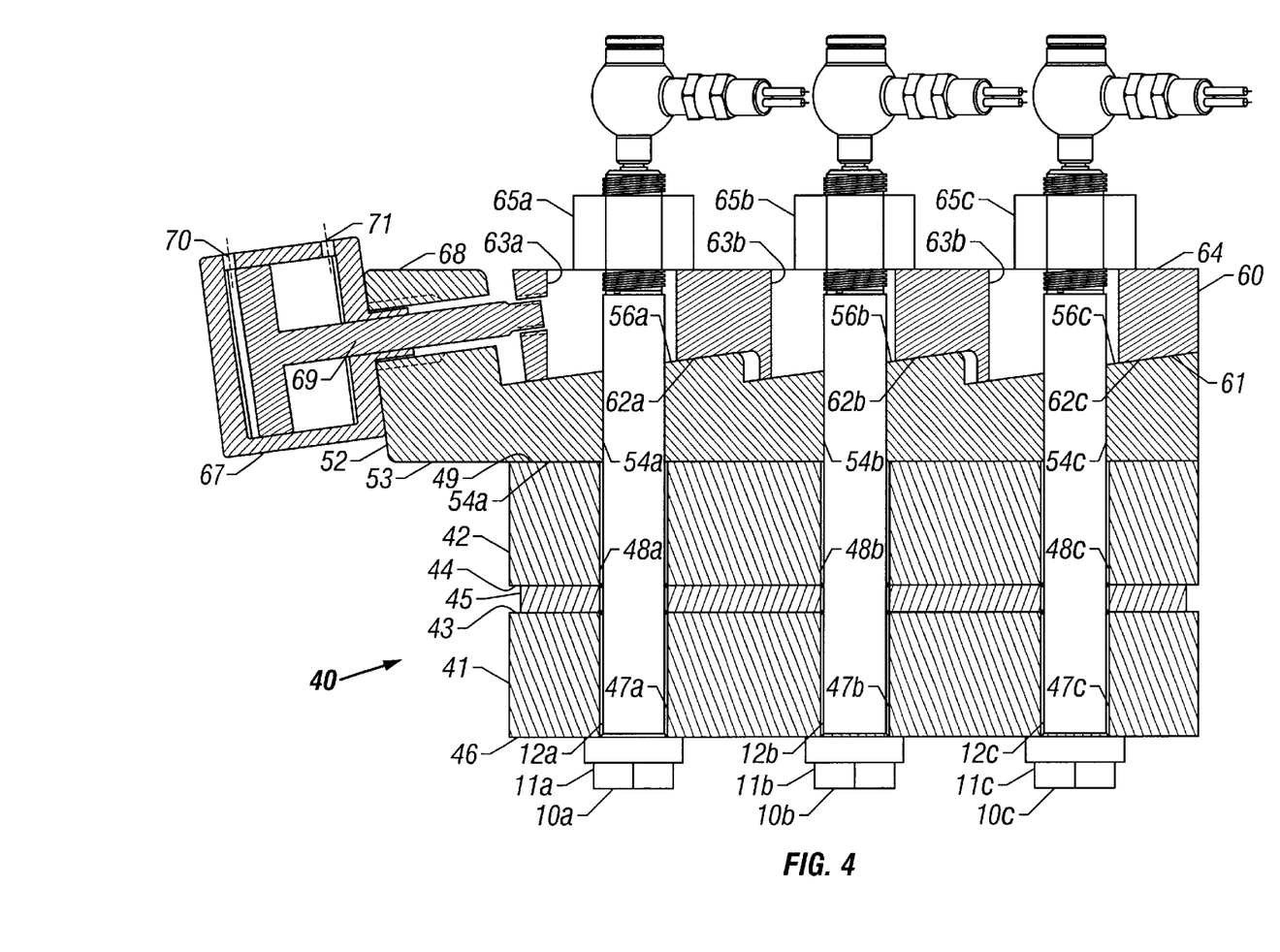
FIG. 4 illustrates a partial cross-section of one embodiment of a wedge system suitable for pretensioning a plurality of bolts.
Figure 5:
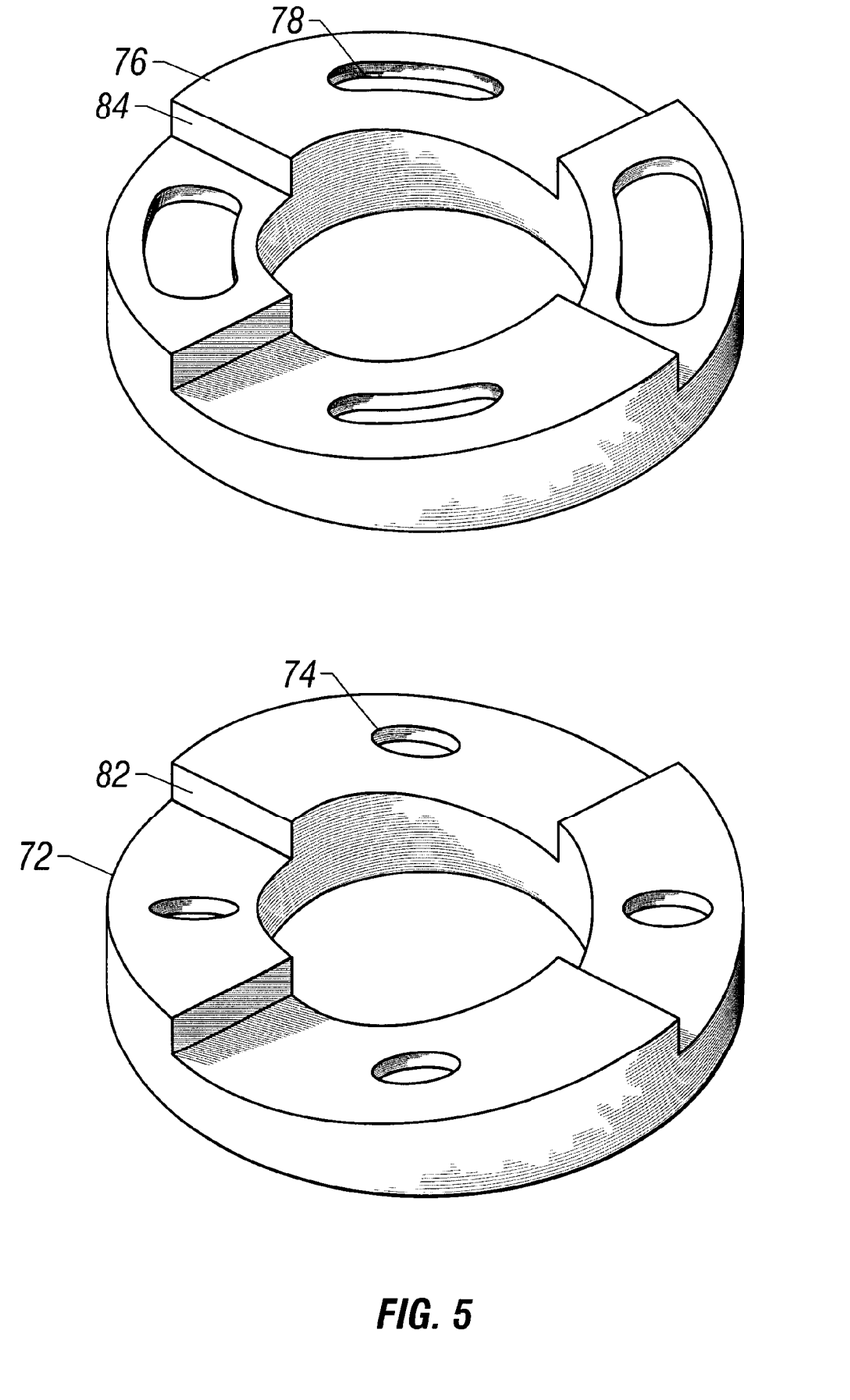
FIG. 5 illustrates one embodiment of a round wedge system suitable for pretensioning of a plurality of bolts.

The wedging system illustrated in FIG. 4 is substantially similar to the wedging system of U.S. Pat. No. 5,437,489. The wedging system 40 can be any shape, including round, as illustrated in FIG. 5. The use of the heated elongated bolts in conjunction with a wedging system is particularly applicable to split-bodied pipeline repair clamps wherein a sealing element must be compressed within a joint or connection, yet it is generally applicable to any clamped joints which require prestressing of the joint interface.

Referring now to FIG. 4, a clampable assembly 40 consists of a first clamp element 41 and a second comating clamp element 42. The embodiment illustrated in FIG. 4 shows the clamp elements 41 and 42 as identical, but in certain cases the clamp elements will be configured differently. Faces 43, 44 of clamp elements 41, 42 respectively are clampable in a reversible manner. Typically, a seal means 45 is positioned between the two clamp elements 41, 42 in order to bear on faces 43, 44 and to provide means for blocking fluid or gas ingress or egress transversely through the clamped interface.

Multiple bolts 10a, 10b, and 10c are mounted such that their heads 11a, 11b, and 11c bear on the back transverse planar surface 46 of clamp element 41 and their shanks 12a, 12b, and 12c project through apertures 47a, 47b, and 47c respectively in the body of clamp element 41. Similarly, clamp element 42 is provided with apertures 48a, 48b, and 48c, that are coaxial with apertures 47a, 47b, and 47c, for the shanks 12a, 12b, and 12c of bolts 10a, 10b, and 10c, respectively. Apertures 48a, 48b, and 48c intersect the back transverse face 49 of second clamp element 42. It is understood that notches may be used in place of apertures 47 and 48 as shown in U.S. Pat. No. 5,437,489.

Each bolt 10 is fitted with an individual internal electrical heating element 20 and traverses the clampable assembly 40. Each bolt's heating element 20 is connected to power source 31 using electrical connectors housed in connector housings 23. When more than one bolt is used, all of the bolts 10 are interconnected to the same power source 31 and can be simultaneously and uniformly heated.

FIG. 4 illustrates seal means 45. One embodiment of seal means 45 is a gasket penetrated with apertures to admit the passage of the bolts 10a, 10b, and 10c. However, a preferred embodiment of seal means 45 is designed such that it is displaced to the side of the bolting apertures 47a, 47b, and 47c and 48a, 48b, and 48c.

Wedge base 52 is provided with bottom face 53, which abuts back face 49 of second clamp element 42. Back face 49 is not necessarily parallel to clamped faces 43, 44. Back face 49 may be inclined somewhat from transverse to the shafts 12a, 12b, and 12c of bolts 10a, 10b, and 10c in order to facilitate assembly, as shown in U.S. Pat. No. 5,437,489, but its angle from normal should be such that shear loads between the mated bottom face 53 and back face 49 of second clamp element 42 can be resisted by friction or a stop ledge. Alternatively, bottom face 53 and back face 49 may be provided with comating stepped faces perpendicular to axes of shafts 12a, 12b, and 12c in order to avoid displacement of the wedging assembly from the clamp elements 41 and 42.

Wedge base 52 has a series of apertures 54a, 54b, and 54c that are coaxial with apertures 47a, 47b, and 47c and 48a, 48b, and 48c and extend through wedge base 52 from bottom face 53. The upper face of wedge base 52 is subdivided into parallel inclined ramps 56a, 56b, and 56c which are centered on the apertures 54a, 54b, and 54c in wedge base 52. These ramps 56a, 56b, and 56c are perpendicular to the side of wedge base 52 and skewed relative to bottom face 53. The ramps 56a, 56b, and 56c are separated by distances, which may not be identical but are predetermined. The slope of the ramps is selected to be non-slipping with about an 8° slope commonly used. The lengths of the ramps are then determined by the amount of slack removal and pretensioning needed for the apparatus to seal properly. Thus, the length of the ramps is partially determined by the material from which bolts 10 are constructed from and the elongation response of that material to increased temperatures.

Top wedge 60 has its bottom surface 61 ramped with parallel and spaced apart ramps 62a, 62b, and 62c which comate with wedge base ramps 56a, 56b, and 56c. The spacings of ramps 62a, 62b, 62c is the same as that for ramps 56a, 56b, and 56c in order to permit mating. Elongate slots 63a, 63b, and 63c extend from the ramped face 61 to the upper face 64 of top wedge 60.

Slots 63a, 63b, and 63c admit the shanks 12a, 12b, and 12c and permit motion of top wedge 60 relative to wedge base 52 and parallel to inclined faces 56 of the wedge base. Upper face 64 of top wedge 60 is transverse to the shanks 12a, 12b, and 12c and provides a bearing surface for threaded nuts 65a, 65b, and 65c attached to bolts 10a, 10b, and 10c respectively by means of threads 14.

FIG. 5 illustrates a round wedging system with the two sides of the wedging system separated laterally and their axes anti-aligned relative to their normally engaged position. The wedge base 72 has a series of apertures 74 and ramps 82. The ramps 82 are mated with the ramps 84 of top wedge 76 having elongated slots 78 to provide for movement of top wedge 76 around the bolts 10 that traverse wedge base 72 and top wedge 76 through apertures 74 and elongated slots 78 respectively.

As seen in FIG. 4, the body of a double-acting hydraulic cylinder 67 is mounted to wedge base 52 by means of frame 68. The end of rod 69 of cylinder 67 is attached to top wedge 60 so that application of pressurized hydraulic fluid to either the piston end port 70 or the rod end port 71 of cylinder 67 will induce relative slippage movement on the comating wedge ramps 56a, 56b, and 56c and 62a, 62b, and 62c. Pressure application at the piston end port 70 causes movement of upper wedge 60 yielding a larger separation between bottom face 53 of wedge bottom 52 and the top face 64 of top wedge 60. In such a manner slack in the connection of clamp elements 41, 42 can be eliminated with relatively low pressure application. The present invention also allows for the considerable pretensioning of assembly 40 with the cooling of the elongated bolts.

Not only is the tightening of bolts a problem in remote applications because of the lack of visibility and equipment access to the bolts, but the loosening of bolts for the replacement or relocation of pressure-containing equipment is a problem. The present invention provides a means to loosen bolts in dangerous or remote environments as well as tighten them. In the embodiment illustrated in FIG. 4, the application of hydraulic pressure to rod end port 71 causes movement of top wedge 60 such that tension is removed from bolts 10a, 10b, and 10c. This loosening of the bolts is typically done when the bolts 10a, 10b and 10c are hotter than when the top wedge 60 is set.

The present invention is simple to place in operation. First, the bolts 10a, 10b, and 10c are swung or otherwise placed into position through apertures 47a, 47b, and 47c and 48a, 48b, and 48c or corresponding notches in first clamp element 41 and second clamp element 42, using a mechanism such as in U.S. Pat. No. 5,437,489. Once the bolts 10a, 10b, and 10c are preassembled in the wedging assembly, the nuts 65a, 65b, and 65c are adjusted until each has the same clearance when the bolt assemblies are swung or otherwise emplaced on the clampable assembly 40. Hydraulic pressure is then introduced into piston end port 70 of hydraulic cylinder 67 in order to force upper wedge 60 to move relative to bottom wedge 52 in order to remove the clearance in the prefitted bolts. This initial pretensioning step is optional, but provides more accuracy in the uniform pretensioning of a series of bolts.

The prefitted bolts 10a, 10b and 10c are heated to a preselected, known differential temperature above ambient. The preferred heating means is an electrical heating element 20, but any heating means can be used. The bolting may be insulated with an insulative covering 8 made of inexpensive but effective materials in order to minimize thermal losses and attendant heating needs in an aqueous or other high heat loss environment. The typical amount of heating required is on the order of 100° to 200° F., which is readily obtainable in either atmospheric or subsea environments. The heating of the bolting is readily controlled with commercially available controllers with feedback provided with thermostats or thermocouples or similar means.

Once the bolts have reached the requisite temperature, hydraulic pressure is reintroduced into piston end port 70 to exert a relatively low level of pretension on the heated bolts. Then the bolts 10a, 10b, and 10c are allowed to return to ambient temperature thereby increasing the pretension on the bolts. In this manner, significant additional bolt stretch with attendant tension is provided to the bolts such that seal element 45 is strongly clamped between clamp element faces 43 and 44. Utilizing this tensioning methodology, a strong seal can be reliably maintained that will withstand large variations in pressure. Furthermore, bolts 10 will undergo smaller stress variations than if the joint were not strongly pretensioned. Once the tensioning has been applied to the seal, the integrity of the seal can be verified by checking to ensure that there is no fluid or gas ingress or egress through the sealed joint.

The clamping can be undone by reversing the clamping procedure. First, the temperature of the bolting is raised a higher temperature above ambient than was used during the pretensioning. Once the bolts have reached the predetermined temperature, hydraulic pressure is applied to the hydraulic cylinder end port 71 in order to move the upper wedge 60 to loosen the bolting. Generally in order to loosen the bolting, one must either apply a somewhat higher hydraulic pressure than was used to pretension the bolting, or one must raise the bolting temperature sufficiently higher than the initial rise in order to permit the same hydraulic pressure as used before to be applied to cylinder rod end port 71 to effect release. Alternatively, hydraulic cylinder 67 can be mounted to pull, rather than push, wedge 60 during pretensioning. This would then make higher force available for releasing the wedge 60 by means of applying the same hydraulic pressure to the larger piston end of the cylinder.

Minimal control functioning and manipulation is required to emplace the clamp using the present invention. Simple positioning means well known in robotic operations may be used. Minimal access is required, since the wedge pretensioning functions use hydraulics only. Inclusion of an electric heating means in such a clamp markedly reduces the size requirement for the hydraulically driven wedge clamping means without appreciable changing the overall size of the clamp.

The advantages of this method include the following. System set up is easy. The mechanical and electrical hardware may be packaged in a compact manner. Emplacement, control, and monitoring by a robotic installation device, such as a Remote-Operated Vehicle (ROV) are simple due to minimal manipulation requirements for the device. Reliable and highly accurate pretensioning of the bolting can be obtained. Very high levels of pretensioning can be obtained with smaller hydraulics than using a wedge method alone in the manner of U.S. Pat. No. 5,437,489. Levels of pretensioning can be selectively varied over a wide range without modifying equipment. The mechanism is easy to release and may readily be reset multiple times. The overall design is more compact and requires less stringent manufacturing quality controls than other methods capable of achieving comparable results. This apparatus and method of clamping is compatible with both relatively flexible elastomeric seals and relatively inflexible metal-to-metal seals.

Having described several embodiments securing pressure-containing equipment, it is believed that other modifications, variations, and changes will be suggested to those skilled in the art in view of the description set forth above. It is therefore to be understood that all such variations, modifications, and changes are believed to fall within the scope of the invention as defined in the appended claims.

What is claimed is:

1. An apparatus for prestressing structural joint connections comprising:
   a first and second clampable element, said clamping elements having comating first surfaces and obverse second surfaces;
   a reciprocable first wedging element having a first face and a second obverse face, said first face having a plurality of ramps;
   a second wedging element having a ramped surface, wherein the ramped surface has a plurality of ramps that comate with the ramps of the first wedging element, wherein said second wedging element is positioned between the second obverse surface of the first clamping element and the ramped first face of the first wedging element;
   a plurality of connecting elements traversing the two clampable elements, wherein each connecting element traverses comating ramps of the first and the second wedging elements, each connecting element further having a first end engaging the second surface of the second clampable element and a second end engaging the obverse face of the first wedging element; and
   heating means for heating the connecting elements, wherein each connecting element has heating means which selectively transfers heat to said connecting element;
   whereby movement of the reciprocable ramped face of the first wedging element when the connecting elements are substantially uniformly heated alters the tension on the connecting elements through the application of a substantially uniform end force to the second end of the connecting elements thereby changing the pressure between the comating first surfaces of the two clampable elements, such alteration of tension modifiable by the transfer of heat to or from the connecting elements.

2. The apparatus of claim 1, wherein the second end of the connecting element is a nut threadably connected to a threaded end of a bolt and the first end of the connecting element is a bolt head.

3. The apparatus of claim 1 wherein the heating means traverses substantially the length of the connecting element.

4. The apparatus of claim 1 wherein the heating means is an electrical resistive heating device.

5. The apparatus of claim 4, further comprising a heating control means for regulating the flow of electricity to the electrical resistive heating device.

6. The apparatus of claim 1, wherein the heating means of the connecting elements are connected to a common power source, whereby the connecting elements are heated at the same time and to the same temperature.

7. The apparatus of claim 1, further comprising one or more temperature sensing devices positioned to determine the temperature of the connecting elements, whereby the selective, independent control of heat application to each connecting element is permitted.

8. The apparatus of claim 7, further comprising a heating control means for regulating the heating of the connecting elements wherein the heating control means is in communication with said temperature sensing device.

9. The apparatus of claim 1 wherein the heating means heats the connecting element to a predetermined temperature.

10. The apparatus of claim 9, wherein the predetermined temperature change ranges from about 100° to about 200° F.

11. The apparatus of claim 1 wherein a portion of an external surface of the connecting elements has an insulative covering.

12. The apparatus of claim 1 wherein the two clampable elements are two halves of a split pipe clamp or two flanged surfaces.

13. The apparatus of claim 1 further comprising an actuator force means connected to the first wedging element, wherein activation of said actuator force causes movement of the ramped face of the first wedging element.

14. The apparatus of claim 13 wherein the actuator force linearly moves the first wedging element to vary the tension on the connecting elements.

15. The apparatus of claim 13, wherein the actuator force is a double-acting hydraulic means.

16. The apparatus of claim 13, wherein the actuator force is remotely activated.

17. The apparatus of claim 1 wherein the ramps of the first face of the first wedging element are parallel inclined ramps, each ramp having an aperture through which one connecting element traverses.

18. The apparatus of claim 17 wherein the slope of the ramp is non-slipping without the application of an actuator force.

19. The apparatus of claim 17 wherein the slope of the ramp is predetermined by the desired pressure to be applied on the comating first surfaces of the two clampable elements.

20. The apparatus of claim 1, wherein at least one sealing element is positioned between the comating first surfaces of the first and second clampable elements.

21. The apparatus of claim 20 wherein the sealing element is a gasket.

22. An apparatus for sealing pressure-containing equipment comprising:
- sealing means for preventing ingress or egress of fluid or gas from the pressure-containing equipment;
- two clamping elements, a first surface of a first clamping element abutting a first surface of the sealing means and a first surface of a second clamping element abutting a second surface of the sealing means;
- a wedging assembly comprising a first and a second component, wherein the components have a plurality of parallel inclined comating ramped first surfaces and the first component has a planar second surface adjacent to the second surface of the first clamping element;
- a double-acting hydraulic means for reciprocably moving the ramped surface of the second component of the wedging assembly;
- a plurality of bolts traversing the two clamping elements and the wedging assembly;
- a plurality of heating elements, wherein one heating element selectively transfers heat to each bolt, said heating elements being interconnected to a common power source to permit uniform heating of said bolts;
- a plurality of tightening elements, wherein one tightening element is threadably connected to a threaded section of each bolt;
- whereby activation of the hydraulic means to induce movement of the ramped surface of the second component of said wedging assembly when the bolts are heated increases the tension on the bolts when the bolts are cooled, thereby increasing the pressure exerted on the sealing means.

23. An apparatus for increasing pressure between comating surfaces by uniformly thermally expanding and tensioning a set of bolts comprising:
- a first and second clampable element, said clamping elements having comating first surfaces and obverse second surfaces;
- a reciprocable first wedging element having a first face and a second obverse face, said first face having a plurality of ramps;
- a second wedging element having a ramped surface, wherein the ramped surface has a plurality of ramps that comate with the ramps of the first wedging element, wherein said second wedging element is positioned between the second obverse surface of the first clamping element and the ramped first face of the first wedging element;
- a plurality of bolts, each bolt having an internal bore;
- a plurality of electrical heating elements, wherein one heating element is placed within the internal bore of each bolt;
- a power source; and
- a series of electrical connectors, each connector connected to the power source, to one heating element within the internal bore of one bolt and to a switch, said switch responding to the temperature of the bolt as determined by a temperature sensor in communication with the one bolt and the switch;
- wherein activation of said power source will heat all of the bolts to about the same temperature, thereby substantially uniformly expanding the bolts such that movement of the reciprocable ramped face of the first wedging element will increase the pressure between the comating first surfaces of the two clampable elements when the bolts are subsequently cooled.

24. A method for prestressing structural joint connections comprising the steps of:
(a) encompassing a structural joint connection with an apparatus for prestressing structural joint connections, the apparatus comprising:
- first and second clampable elements, said clamping elements having comating first surfaces and obverse second surfaces;
- a first wedging element having a first face and a second obverse face, said first face having at least one ramp;
- a second wedging element having a ramped surface, wherein each ramp of the ramped surface comates with one ramp of the first wedging element, wherein said second wedging element is positioned between the second obverse surface of the first clamping element and the ramped first face of the first wedging element;
- one or more connecting elements traversing the two clampable elements, the first wedging element and the second wedging element, each connecting element having a first end engaging the second surface of the second clampable element and a second end engaging the obverse face of the first wedging element; and
- heating means for heating the connecting elements, wherein one heating means selectively transfers heat to each connecting element;

(b) thermally expanding the connecting elements to obtain increased lengths of said connecting elements relative to the unheated lengths of the connecting elements thereby reducing the tension on the connecting elements;

(c) activating a double-acting hydraulic means connected to the first wedging element;

(d) moving the first ramped surface of the first wedging element to produce an initial wedging of the comating ramped faces of the first wedging element and the second wedging element to achieve an increased level of tension on the connecting elements; and (e) cooling the connecting elements to decrease the length of the connecting elements to further increase the tension on the connecting elements thereby increasing the compression on the comating first surfaces of the two clampable elements.

25. The method of claim 24, further comprising the step of installing at least one sealing means between the comating first surfaces of the first and second clampable elements.

26. The method of claim 25, further comprising the step of verifying the integrity of the seal provided by the compression of the two clampable elements on the sealing means by ensuring there is no fluid egress or ingress of liguid or gas across the seal.

27. The method of claim 24, further comprising the step of installing a temperature sensing device on each connecting element, wherein the temperature of each connecting element can be independently determined.

28. The method of claim 27, further comprising the step of installing heating control means for regulating the thermal expansion of the connecting elements, wherein said heating control means is in communication with said temperature sensing device.

29. The method of claim 24, wherein said heating means is an electrical resistive heating device.

30. The method of claim 29, further comprising the step of connecting the heating means to a common power source.

31. A method for prestressing structural joint connections comprising:
   (a) encompassing a structural joint connection with an apparatus for prestressing structural joint connections, the apparatus comprising:
       first and second clampable elements, said clamping elements having comating first surfaces and obverse second surfaces;
       a tightening element having a first face and a second obverse face, said first face having at least one ramp;
       a wedging assembly having a ramped surface, wherein each ramp of the ramped surface comates with one ramp of the tightening element, wherein said wedging assembly is positioned between the second obverse surface of the first clamping element and the ramped first face of the tightening element;
       one or more connecting elements traversing the two clampable elements, the tightening element and the wedging assembly, each connecting element having a first end engaging the second surface of the second clampable element and a second end engaging the obverse face of the tightening element; and
       a plurality of heating means for heating the connecting elements, wherein one heating means selectively transfers heat to each connecting element;
   (b) activating a double-acting hydraulic means connected to the tightening element;
   (c) moving the first ramped surface of the tightening element to produce an initial wedging of the comating ramped faces of the tightening element and the wedging assembly to achieve a first level of tension on the connecting elements;
   (d) thermally expanding the connecting elements to obtain increased lengths of said connecting elements relative to the unheated lengths of the connecting elements thereby reducing the first level of tension on the connecting elements; and
   (e) moving the first ramped surface of the tightening element to produce a second wedging of the comating ramped faces of the tightening element and the wedging assembly thereby increasing the tension on the connecting elements to a second level of tension on the connecting elements; and
   (f) cooling the connecting elements to decrease the length of the connecting elements to further increase the tension on the connecting elements thereby increasing the compression on the comating first surfaces of the two clampable elements.

32. An apparatus for prestressing structural joint connections comprising:
   a first and second clampable element, said clamping elements having comating first surfaces and obverse second surfaces;
   a first wedging element having a first face and a second obverse face, said first face having at least one ramp;
   a second wedging element having a ramped surface, wherein each ramp of the ramped surface is comating with one ramp of the first wedging element, wherein said second wedging element is positioned between the second obverse surface of the first clamping element and the ramped first face of the first wedging element;
   an actuator force means connected to the first or second wedging element, wherein activation of said actuator force causes movement of the ramped face of the first wedging element
   one or more connecting elements traversing the two clampable elements, the first wedging element and the second wedging element, each connecting element having a first end engaging the second surface of the second clampable element and a second end engaging the obverse face of the first wedging element; and
   heating means for heating the connecting elements, wherein each connecting element has heating means which selectively transfers heat to said connecting element;
   whereby movement of the ramped face of the first or second wedging element when the connecting elements are heated alters the tension on the connecting elements through the application of end force to the second end of the connecting elements thereby changing the pressure between the comating first surfaces of the two clampable elements, such alteration of tension modifiable by the transfer of heat to or from the connecting elements.

33. The apparatus of claim 32, wherein the actuator force is a double-acting hydraulic means.

34. The apparatus of claim 32, wherein the actuator force is remotely activated.

* * * * *